United States Patent [19]

Karbo

[11] 4,173,328
[45] Nov. 6, 1979

[54] IN-LINE SHUT-OFF VALVE

[75] Inventor: Richard S. Karbo, Newport Beach, Calif.

[73] Assignee: The Leisure Group, Carson, Calif.

[21] Appl. No.: 903,179

[22] Filed: May 5, 1978

Related U.S. Application Data

[63] Continuation-in-part of Ser. No. 718,978, Aug. 30, 1978, abandoned.

[51] Int. Cl.² ............................................. F16K 5/00
[52] U.S. Cl. ................................. 251/309; 251/288; 251/317; 251/357
[58] Field of Search ............... 251/288, 292, 305, 309, 251/315, 317, 357; 74/545, 552, 553, 557, 558; 16/117, 118, 121, DIG. 18, DIG. 19, DIG. 30

[56] References Cited

U.S. PATENT DOCUMENTS

| 3,296,026 | 1/1967 | Long | 251/317 |
|---|---|---|---|
| 3,360,236 | 12/1967 | Hulslander | 251/309 |
| 3,787,028 | 1/1974 | Semon | 251/317 |
| 3,985,335 | 10/1976 | Burke | 251/288 |
| 4,015,816 | 4/1977 | Semon | 251/309 |

FOREIGN PATENT DOCUMENTS

| 904790 | 11/1945 | France | 251/309 |
|---|---|---|---|
| 831809 | 3/1960 | United Kingdom | 251/309 |
| 380893 | 5/1973 | U.S.S.R. | 251/309 |

Primary Examiner—William R. Cline
Assistant Examiner—H. Jay Spiegel
Attorney, Agent, or Firm—Jackson, Jones & Price

[57] ABSTRACT

A positive-action non-leaking shut-off valve that requires minimal arcuate movement of the manual actuator from full-open to full-closed position is provided by three major components. A valve housing has a water-flow channel therethrough along its longitudinal axis and a cylindrical bore through said valve housing transversal to said water-flow channel. A lever-actuated valve shaft fits snugly into said bore. The valve shaft carries a plug therein that is centered for rotation about the centerline of the bore through the housing. The plug stoppers the water-flow channel when it is rotated against the openings that the water-flow channel makes with the cylindrical bore.

10 Claims, 4 Drawing Figures

U.S. Patent   Nov. 6, 1979   4,173,328
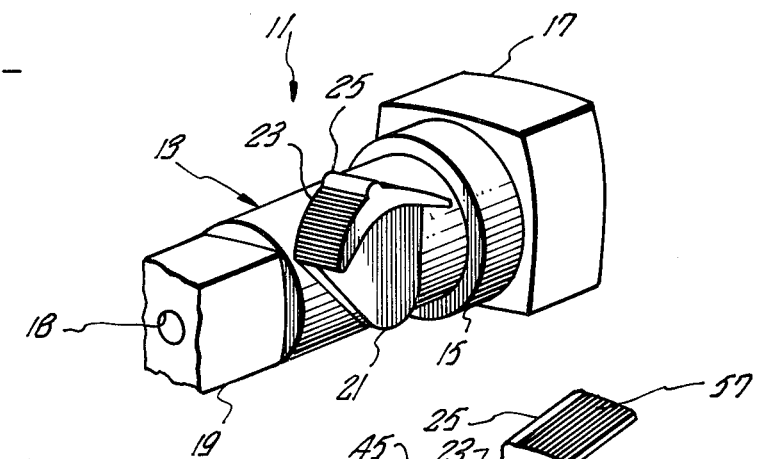
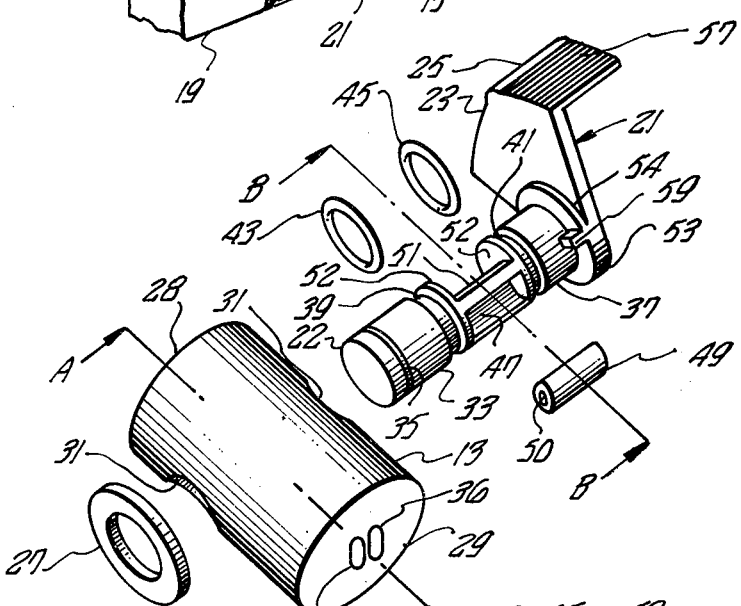
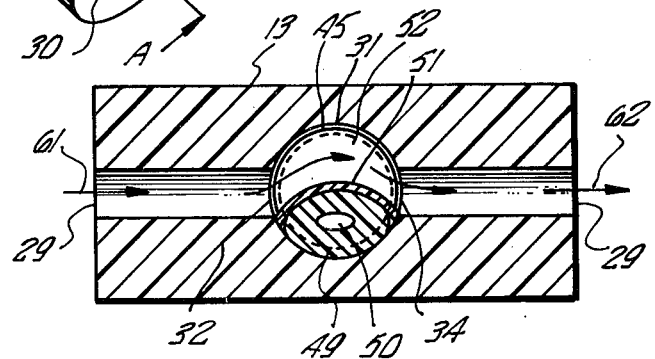
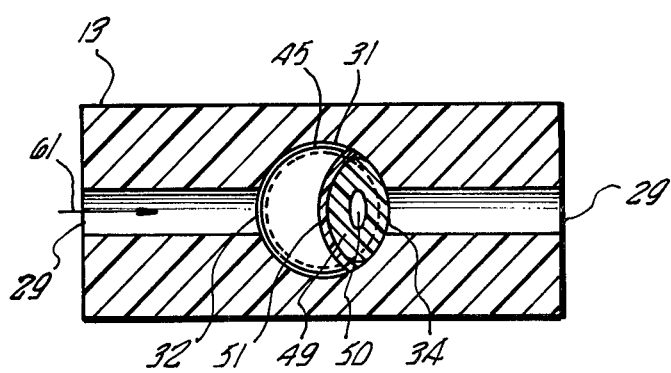

IN-LINE SHUT-OFF VALVE

CROSS-REFERENCE TO RELATED APPLICATION

This application is a continuation-in-part of application having U.S. Ser. No. 718,978, now abandoned filed on Aug. 30, 1978 for In-Line Shut-Off Valve.

BACKGROUND OF THE INVENTION

The present invention relates generally to improvements in fluid valves, and more particularly pertains to new and improved valves for use in controlling and stopping the flow of water in water channels, such as water hoses or sprayers and applicators for other Agricultural and Horticultural use.

Many different types of water-flow stoppering and regulating valves are utilized by the home gardener for controlling the flow of water through garden hoses and sprayer devices. On the whole, these valves are rather complicated devices if they are designed for a longer service life, thereby increasing the cost of the garden implements on which they are used. Even the more expensive complicated valves do not meet the requirements of a long service life without any leaks.

OBJECTS AND SUMMARY OF THE INVENTION

An object of this invention is to provide an easy-to-operate, minimum-parts shut-off valve, capable of a long service life.

This object and the general purpose of this invention are accomplished by providing a housing having a water-flow channel therethrough and a valve shaft rotatable in a cylindrical bore transverse to the water-flow channel. The valve shaft carries a plug which is rotated against an aperture termination of the flow channel with the wall of the cylindrical bore, thereby stoppering the flow channel. When the plug is not rotated against the flow channel aperture, water in the flow channel is permitted to flow through the valve shaft journal in the cylindrical bore, out the other aperture on the cylindrical bore wall, and into the continuation of the water-flow channel.

BRIEF DESCRIPTION OF THE DRAWING

Other objects and many of the attending advantages of this invention will be readily appreciated as the same becomes better understood by reference to the following detailed description when considered in conjunction with the accompanying drawings in which like reference numerals designate like parts throughout the Figures thereof and wherein:

FIG. 1 is a perspective of a valve assembly according to the present invention in a typical environment;

FIG. 2 is an exploded perspective of the valve assembly of FIG. 1;

FIG. 3 is a cross-sectional view along sectional lines A—A and B—B of the valve in an open position;

FIG. 4 is a cross-sectional view along sectional lines A—A and B—B showing the valve in a closed position.

DESCRIPTION OF THE PREFERRED EMBODIMENT

The valve 11 of the present invention is essentially made up of three basic elements. The basic elements are a housing 13, and valve shaft 22 (FIG. 2) with a lever 21 attached thereto. These parts are preferably made out of plastic. The valve is generally inserted in a water-flow path. A typical example of its use is shown in FIG. 1 wherein it is connected by way of a hose-coupling device comprising a threaded member 17 and boss 15 to a standard garden hose. The other end of the valve housing 13 is coupled to an outlet 19 which may, for example, be a jet for discharging the water into the atmosphere, or may be an adapter for connection of the valve to a sprayer, etc. In either application, the water flows from the valve housing 13 through the aperture 18 of the adjacent flow-channel device 19.

The lever 21 is adapted for easy manipulation by an operator by having a gripping surface 23 attached to the large end of the lever 21. The gripping surface lies in a plane perpendicular to the plane within which the lever 21 is located. Gripping surface 23 has serrations 57 (FIG. 2) therein and a ridge 25 halfway between its opposite ends to improve gripping contact between the gripping surface and an operator. The lever 21 is preferably cam-shaped. The gripping surface is shaped to conform to the larger end of the cam 21.

As can be seen in FIG. 2, the valve housing 13 is essentially a cylinder having a water-flow channel made up of passageways 28, 29 and 30 through its symmetrical center along its axis of symmetry and a cylindrical bore 31 therethrough which is perpendicular to the axis of symmetry of the water-flow channel. Thus, the fluid will enter the valve housing at one end and pass through to the other end or be stoppered by the action of the valve 22 that is located within the bore 31 of the valve housing.

The valve-shaft-stoppering mechanism of the present invention is generally made up of a pair of cylindrical pins 33 and 37 with web members 52 and a journal 51. The journal has a concave cavity 47 therein which acts as a valve seat. A gasket material such as neoprene rubber or other similar material is used to form a plug 49 having a hollow core 50 therein. The plug 49 is preferably a cylindrical hose of neoprene rubber of the appropriate diameter to be inserted into the cavity 47 and held in place by the walls of the bore 31 of the valve housing 13. The plug 49 is provided a hollow core 50 in order to distribute the pressure between the valve seat 47 and the walls of the cylindrical bore 31 more evenly. Cylindrical pin 33, which is on one side of the journal 51, has a circular groove 35 therein which receives and locks the washer 27 into place. Once the valve shaft is inserted into the housing 13 and washer 27 locked into place, it cannot be removed. This is so because on the other side of journal 51 is cylindrical pin 37 which is fastened to cam 21 at its smaller radius end 53. Cam 21 has a washer 54 formed therein which rides against a housing surface (not shown). A rectangular ridge 59 is formed on the surface of the washer 54 and acts as a stop for the arcuate movement of the valve assembly as actuated by the cam lever 21.

The valve shaft assembly has a pair of circumferential grooves 39 and 41 at opposite ends of the journal on the other side of the web members 52. A pair of "O" rings 43 and 45 respectively, are maintained in position by these grooves. When the valve assembly is inserted into the bore 31 of the valve housing 13, these "O" rings form a seal between the walls of the bore 31 and the valve shaft 22 so that a sealed chamber having the journal 51 therein is formed. The journal 51 rotates within this sealed chamber as dictated by the movement of the cam lever 21.

FIG. 3 illustrates the relationship of the journal 51, the plug 49 located in the recess of the journal 51, the water-flow path 29, and bore 31 of the valve housing 13. The valve housing 13 has been sectionalized along the line A—A, and the valve shaft has been sectionalized along the line B—B. These two lines are identical when all parts of the valve are assembled. FIG. 3, however, illustrates a sectional view only of the valve shaft and valve housing 13 when in a cooperative assembled relationship.

The bore 31 through the valve housing 13 has a pair of openings 32 and 34 in its wall because of the flow channels 28, 29 and 30 through the symmetrical center of the valve housing 13. Water entering at end 61 will pass through channel 28, which is preferably cylindrical, to the first bore opening 32 and into the bore 31. The water will flow past journal 51, in the bore 31, and out the second bore opening 34. The second bore opening 34 consists of two elongated openings formed by the two elongated channels 29 and 30. The water leaves the valve housing at end 62. The journal 51 of the valve shaft is shown in FIG. 3 to be in its fully opened position. The "O" rings 43 and 45 along with the web members 52, prevent any water from leaking beyond the "O" rings.

Refer now to FIG. 4 wherein the same relationship between journal 51, sealing plug 49, bore 31 and flow channels 28, 29 and 30 are illustrated. The only difference between FIG. 3 and FIG. 4 is that the journal 51 and plug 49 have been moved to the fully closed position. As can be seen from the drawing, the stoppering plug 49 is located against the second bore opening 34 formed in the wall of bore 31 by channels 29 and 30. This is the opening through which the water flow 61 leaves the bore 31. By stoppering this opening, the water-flow channel is completely blocked.

The second bore opening 34 is actually a pair of elongated openings formed by the channel 29 and 30 which have elongated cross-sections. By utilizing a pair of elongated openings, the plug 49 is supported by the rib structure 36 between the two channels 29 and 30. This support allows the plug to be moved into and out of engagement with the second bore opening even under a high-pressure water flow.

It will be recognized that there are positions between those illustrated in FIGS. 3 and 4 of the journal that will control the volume of water flowing in channel 29. Therefore, by rotating the stoppering plug 49 to partially block bore opening 34, in bore 31, the amount of water passing through the bore-valve chamber is impeded, thereby controlling the flow of water out of the valve housing 13.

What has been described is an easy-to-operate, minimum-parts shut-off valve that is capable of a long service life for use in the control of water flow in water channels, such as found in garden hoses and sprayers, etc. It should be understood, of course, that the foregoing disclosure relates only to a preferred embodiment of the invention, and that modifications may be made therein without departing from the spirit and scope of the invention as set forth in the appended claims.

What is claimed is:

1. An in-line shut-off valve comprising:
   a valve housing having a straight water flow channel therethrough and a cylindrical bore through the valve housing having its axis of symmetry perpendicular to the axis of symmetry of the water flow channel, said water flow channel terminating as two apertures in the wall of said cylindrical bore;
   a valve shaft placed for rotation about its axis of symmetry in said cylindrical bore, said valve shaft having a journal extending along a portion of said shaft and overlapping said apertures in the wall of said bore, said journal having a convex surface of curvature and an elongated concave cavity therein, opposite said convex surface, the cavity being equal in length along said shaft to the length of the journal, water flowing from one aperture to the other around the convex surface in the bore when the valve is open; and
   an elongated plug captured by the cavity in said journal, said plug having one side exposed and abutting the wall of said bore, the exposed surface of said plug being of a size to overlap one of the apertures in the wall of the cylindrical bore whereby rotation of said valve shaft causes said plug to slidably engage and seal this aperture.

2. The shut-off valve of claim 1 further comprising a cam-shaped lever fixedly attached at its smaller curved end to one end of said valve shaft, said lever having a gripping surface attached to its larger curved end, said gripping surface lying in a plane perpendicular to the plane of said lever.

3. The shut-off valve of claim 2 wherein the gripping surface of said lever conforms to the curvature of the larger end of said lever, the surface thereof being serrated to facilitate gripping.

4. The shut-off valve of claim 1 wherein said valve shaft includes a pair of grooves around its circumference at opposite ends of said shaft; and
   a pair of "O" ring seals, one located in each groove on said valve shaft, said "O" ring seals engaging the wall of said cylindrical bore thereby forming a waterproof seal between the valve shaft and the wall of the cylindrical bore.

5. The shut-off valve of claim 4 further comprising an additional groove on the valve shaft at the end thereof opposite the end fastened to said lever; and
   a washer which fits over the end of said shaft and is captured by the additional groove to maintain said shaft in the cylindrical bore.

6. The shut-off valve of claim 1 wherein said elongated plug has a hollow core.

7. The shut-off valve of claim 6 wherein said elongated plug is cylindrical prior to being inserted into the cavity in said journal.

8. The shut-off valve of claim 1 wherein said elongated plug is cylindrical prior to being inserted into the cavity in said journal.

9. The shut-off valve of claim 1 wherein the flow channel in said valve housing terminates as an inlet aperture and an outlet aperture in the wall of said cylindrical bore, and said outlet aperture comprises a pair of independent flow channels located side by side and defining a rib means therebetween.

10. The shut-off valve of claim 9 further comprising a protruding ridge element attached to the surface of the valve shaft at the end thereof to which said lever is fixedly attached, said protruding ridge element located to permit the valve shaft to be rotated in a defined arc whereby said elongated plug only slidably engages the outlet aperture in said cylindrical bore.

* * * * *